Dec. 23, 1924.

D. B. SMITH

TRANSMISSION RELINING BAND

Filed Dec. 3, 1923   2 Sheets-Sheet 1

1,520,154

INVENTOR
DOUGLAS B. SMITH
BY
ATTORNEYS.

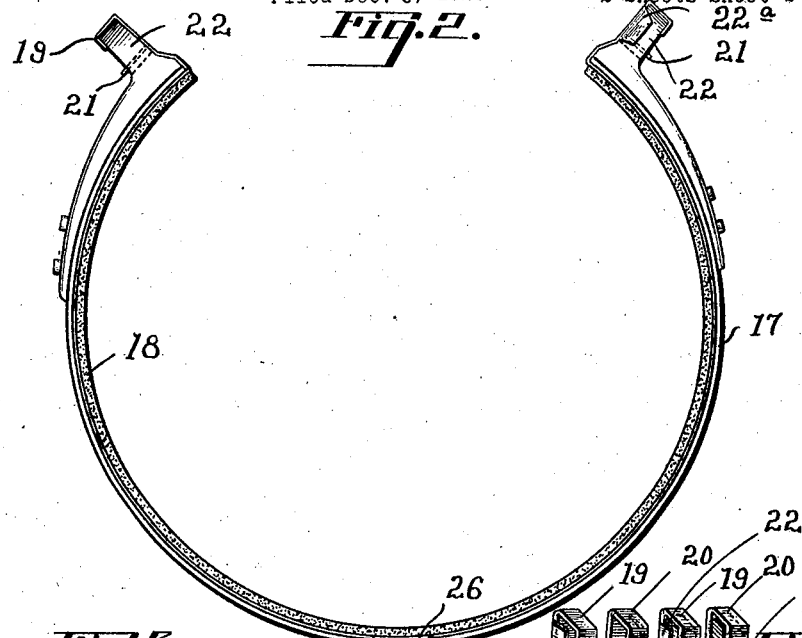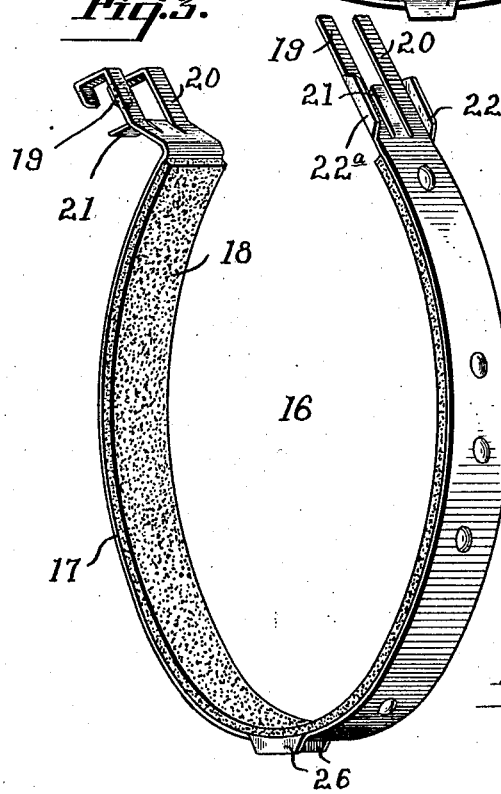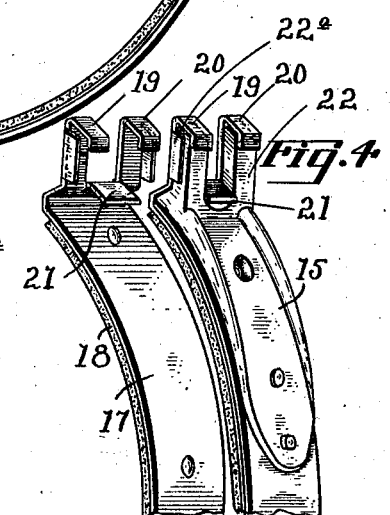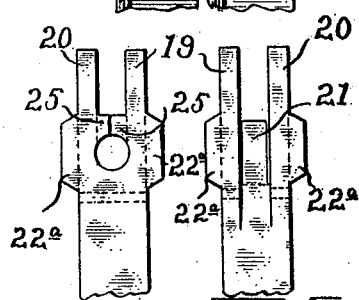

Patented Dec. 23, 1924.

1,520,154

UNITED STATES PATENT OFFICE.

DOUGLAS B. SMITH, OF SAN FRANCISCO, CALIFORNIA.

TRANSMISSION RELINING BAND.

Application filed December 3, 1923. Serial No. 678,194.

*To all whom it may concern:*

Be it known that I, DOUGLAS B. SMITH, a citizen of the United States, residing in the city and county of San Francisco and State of California, have invented new and useful Improvements in Transmission Relining Bands, of which the following is a specification.

This invention relates to liners for the bands of transmissions of the planetary type, and particularly pertains to certain improvements over the type of liner disclosed in my prior application entitled Transmission relining band, filed September 24, 1923, Serial No. 664,363.

In general, liners of the type referred to are flexible in construction and are capable of being positioned on the transmission bands upon removal of the transmission cover and the old band linings and by inserting the ends of the new linings between the bands and the drums. The liners may then be forced around the periphery of the drums between the latter and the bands and connected to the bands at their ends. By the use of this type of liner the operation of relining planetary transmission bands is expedited, as the necessity of completely disassembling the transmission when the bands are in need of relining is eliminated.

It is the principal object of the present invention to generally improve the construction of liners of the type referred to whereby to provide an inexpensive and improved liner which may be easily and quickly inserted in place in a planetary transmission without disassembling the latter, which liner is fitted with means for guiding it around the transmission band when being inserted in place and for maintaining the liner in a correct position relative to the band upon which it is fitted. The liner is further provided with improved means for a locking engagement between the ends of the latter and the transmission band.

In carrying out this object I form the ends of the liner band in a manner permitting them to be easily locked into engagement with the ends of the transmission band upon which it is mounted. Also, at one end of the liner, and at other points around its periphery, I arrange guide lugs engageable with the sides of the transmission band for guiding the liner when it is being inserted, which lugs are also adapted to aid in maintaining the liner in correct position relative to the band.

The invention is illustrated by way of example in the accompanying drawings in which:

Fig. 2 is a side elevation of the transmission band with my improved liner fitted thereto.

Fig. 3 is a perspective view of the liner disclosing its improved construction.

Fig. 4 is two fragmentary views in perspective of one end of the transmission band and one end of the liner disclosing the manner in which the end of the liner is connected to the transmission band.

Fig. 5 is a fragmentary view of one end of the liner prior to its being bent into shape for engagement with the end of the transmission band.

Fig. 6 is a similar view disclosing a slightly modified form.

Figure 1:
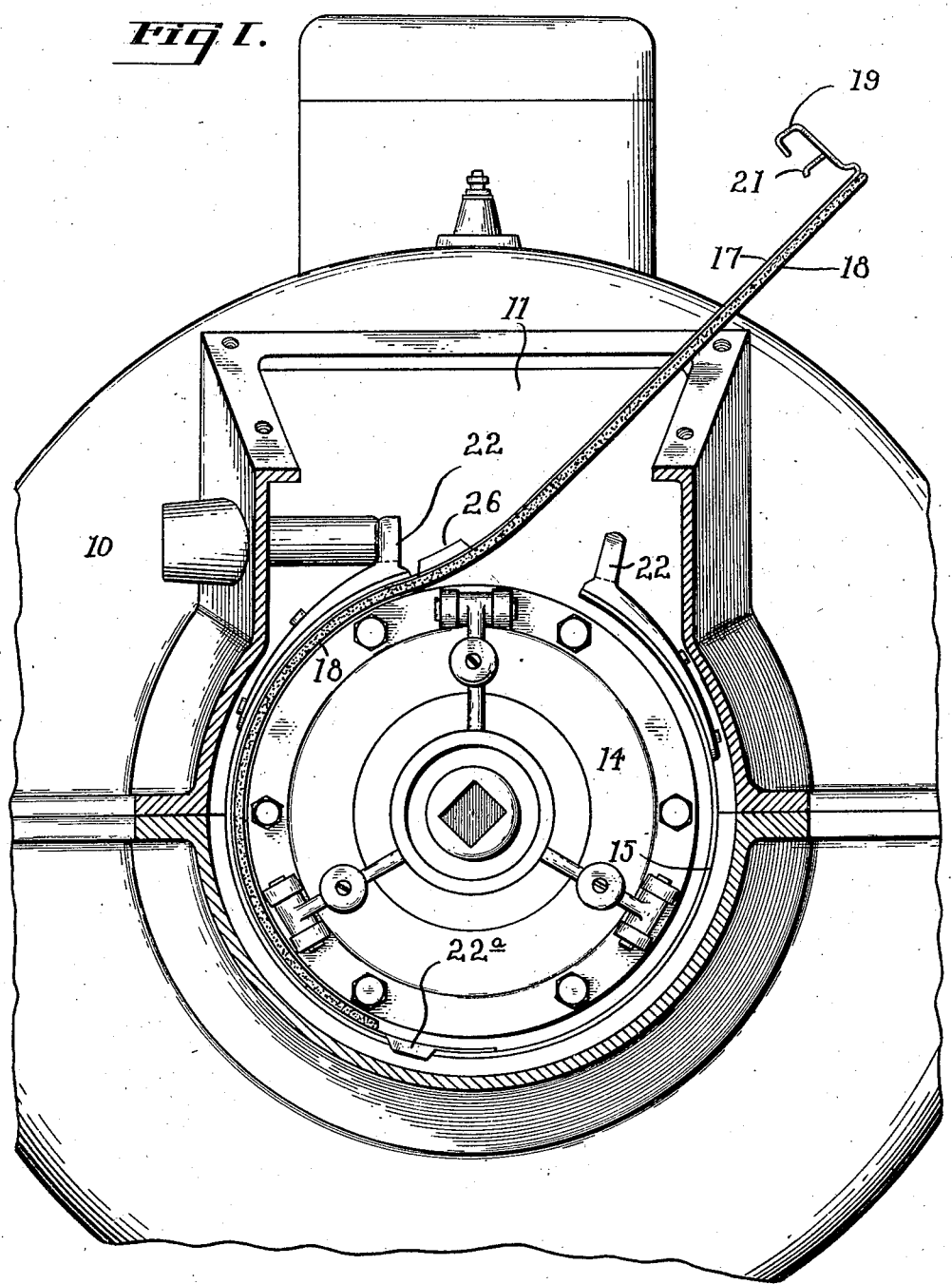
Fig. 1 is a transverse section through a planetary type of transmission showing my improved band liner being inserted therein

Referring more particularly to the accompanying drawings, 10 indicates the transmission case of a planetary transmission which in the present instance is illustrated as the type used in the Ford automobile. The top of the case 10 is formed with an opening 11 which is provided with a removable cover plate (not shown). The case 10 encloses a planetary transmission having the usual drums 14 and operating bands 15. The lining of these bands may be replaced to insure proper operation of the transmissions. For this purpose I provide a liner 16 which is clearly illustrated in Fig. 3 and comprises a flexible band 17 preferably of steel and a treated fabric lining 18 which is riveted or otherwise secured to the interior surface of the band. The terminating ends of the flexible band 17 are formed as disclosed in Fig 5.

Reference being had to this figure, it is seen that the band is formed with elongated prongs 19 and 20 and a short prong 21 between the same. At the sides of the band guide lugs 22ª are formed which, when the band is to be inserted into place, are bent at right angles to the face of the flexible band so as to engage the sides of the transmission band for the purpose of guiding the liner when the latter is being fed around between the transmission band and the drum.

The prongs 19, 20, and 21 constitute means for forming a locking engagement between the ends of the liner and the ends of the transmission band.

Referring to Fig. 4, it is seen that the prongs 19, 20 and 21 may be bent to embrace the U-shaped end lug 22 of the transmission band. The short prong 21 may be bent to extend between the upstanding legs of the end lug 22, and then bent to engage the rear surface of the lug. The long prongs 19 and 20 may be bent inwardly against the front surface of the lug in parallelism therewith and then hooked at their ends to embrace the upper ends of the upstanding portions of the lug.

The modified form disclosed in Fig. 6 is very similar to that shown in Fig. 5 with the exception that the short prong 21 is eliminated and short side prongs 25 are substituted therefor. These prongs are adapted to be bent at right angles to the surface band to engage the sides of the slotted opening in the lug on the transmission band.

To position the liner in place without disassembling the entire transmission, the transmission case cover is removed. The band operating shafts are then disconnected from the bands and the old liners removed from the bands.

In practice, the prongs at one end of the liner are preferably preformed into the shape shown in Fig. 4 so that the end of the liner may be quickly engaged with the end lug at one end of the transmission band. The other end, however, is left flat as shown in Fig. 5 with the exception that the guide lugs 22ª are bent into position. This latter end of the liner is then inserted between the transmission band and the drum as shown in Fig. 1 with the guide lugs 22ª in engagement with opposite sides of the transmission band. The reliner may then be forced around the periphery of the band between it and the drum until the ends of the liner are aligned with the end lugs on the band. The pre-bent end of the liner is then connected to the adjacent end lug. The prongs of the other end of the liner are then bent as described to form a locking engagement between the liner and the opposite end lug.

To firmly maintain the liner in correct position relative to the transmission band, at the center of the liner I form additional guide lugs 26. These lugs are formed integral with the flexible band and extend at right angles to the surface thereof to engage the sides of the transmission band. These guide lugs assist the locking connections between the ends of the transmission band and the ends of the liner in maintaining the liner in correct position on the band and to prevent it from becoming out of alignment and interfering with the proper operation of the transmission.

In Fig. 4 it is illustrated that when the liner is properly positioned on the transmission band, the lugs 22 are in engagement with the sides of the end lug on the transmission band.

From the foregoing it is obvious that the reliner here shown and described is of simple and inexpensive construction and may be inserted into place in a transmission quickly and with ease and will engage the transmission band in such a manner that it will not become out of alignment and interfere with the operation of the transmission.

While I have shown the preferred form of my invention as now known to me, I wish it understood that various changes may be made in its construction without departing from the spirit of the invention as defined in the appended claim.

Having thus described my invention, what I claim and desire to secure by Letters Patent is:—

A liner for a transmission or like band comprising a flexible band having a lining secured on its interior surface, each end of said flexible band terminating in two elongated side prongs adapted to be bent into locking engagement with the legs of the U-shaped end lug of the transmission band, a short central prong adapted to be bent between the legs of the end lugs, and guide lugs at one end of the flexible band extending from the outer edges of the side prongs and adapted to be bent at right angles to the surface of the flexible band to engage the sides of the transmission band to guide the liner when it is being inserted into place.

DOUGLAS B. SMITH.